United States Patent [19]

Hurner

[11] 4,257,890
[45] Mar. 24, 1981

[54] FUEL-WATER SEPARATOR

[76] Inventor: Erwin E. Hurner, 2605 S. Rivershore Dr., Moorhead, Minn. 56560

[21] Appl. No.: 60,622

[22] Filed: Jul. 25, 1979

[51] Int. Cl.³ .................. B01D 35/02; B01D 35/18
[52] U.S. Cl. .................................. 210/112; 210/117; 210/181; 210/305; 210/309; 210/311; 210/439; 210/440; 210/442; 210/443; 210/456; 210/457
[58] Field of Search .............. 210/23 R, DIG. 5, 181, 210/303, 304, 305, 308, 309, 310, 311, 437, 438, 439, 440, 441, 442, 443, 456, 457, 458, 461, 321 R, 112, 117

[56] References Cited

U.S. PATENT DOCUMENTS

| | | | |
|---|---|---|---|
| 1,197,634 | 9/1916 | Hull | 210/443 |
| 1,401,976 | 1/1922 | Giovannoni | 210/443 |
| 1,609,856 | 12/1926 | Blackman | 210/305 |
| 1,638,066 | 8/1927 | Smythe | 210/442 |
| 1,828,484 | 10/1931 | Zimmerman | 210/443 |
| 2,352,356 | 6/1944 | Albertson | 210/437 |
| 3,052,358 | 9/1962 | Stoermer | 210/181 |
| 3,929,187 | 12/1975 | Hurner | 165/52 |

Primary Examiner—Ivars C. Cintins
Assistant Examiner—David R. Sadowski
Attorney, Agent, or Firm—Williamson, Bains, Moore & Hansen

[57] ABSTRACT

A device for separating water from diesel fuel is adapted to be used with conventional fuel filter fittings and consists of a conical screen-like member which serves to separate the water from the fuel and in which the inlet providing the fuel which may have water therein is interior of the downwardly diverging conical member. A quiet zone is provided at the base of the cone to reduce turbulence and allow the water to be drained off by an automatically operated valve which operates in conjunction with the air compressor already on the truck.

2 Claims, 2 Drawing Figures

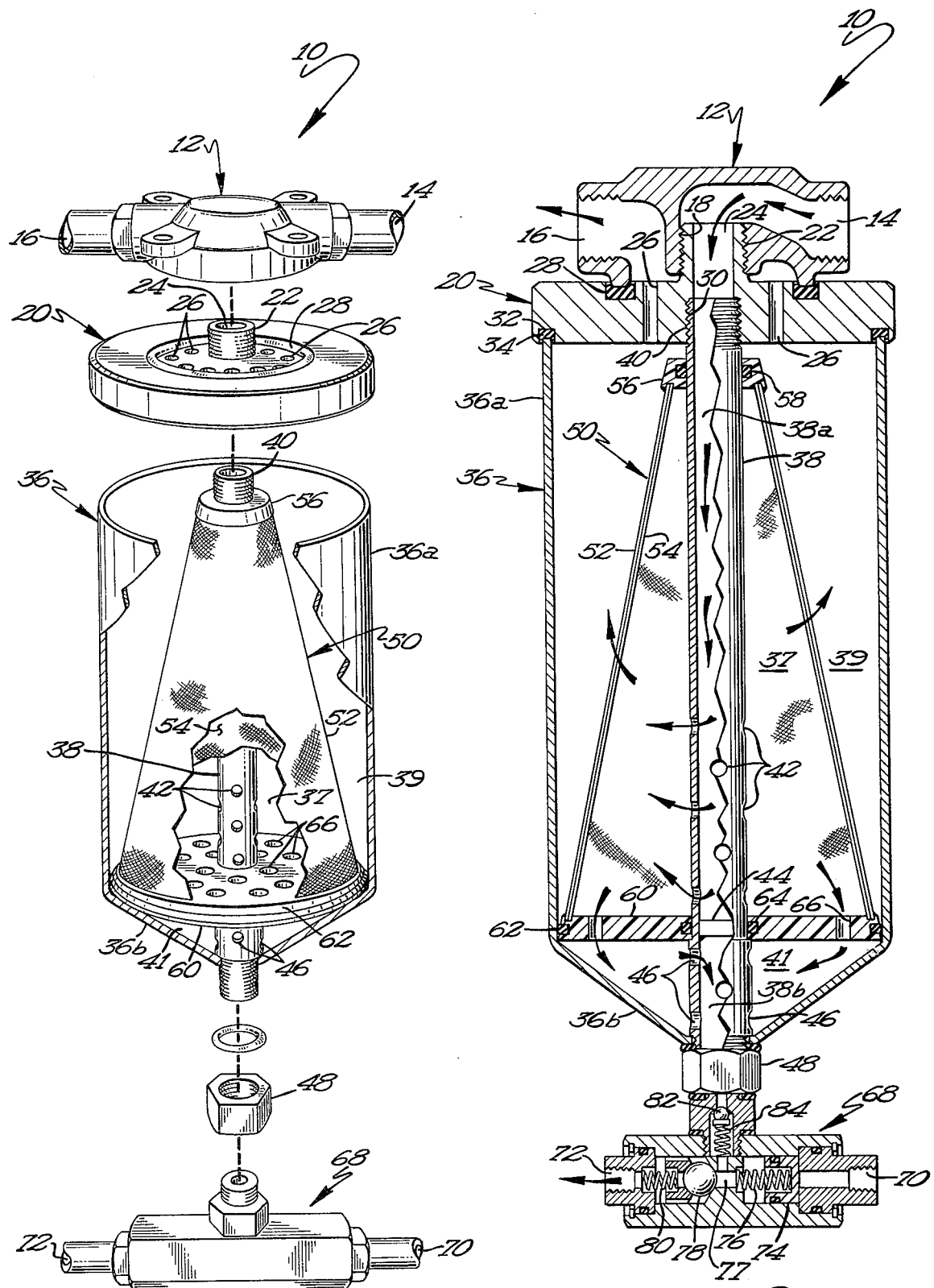

FUEL-WATER SEPARATOR

BACKGROUND OF THE INVENTION

This invention concerns devices for separating water from diesel fuel which is a particular problem in colder climates. In those regions, often the presence of water in the fuel will cause the fuel filter to become clogged and the engine to quit running. It is, therefore, desired to have a simple straight-forward device which will accomplish the removal of water from the fuel with a minimum of maintenance. While several prior devices have been proposed, those devices have required periodic attention by the driver or maintenance department at intervals much shorter than any other maintenance would normally be performed. These shortcomings include the requirement that the water be drained out of the device manually and that the screen or other separating device be cleaned regularly. It is, therefore, an object of this device to be able to operate at long intervals without maintenance and which, when maintenance is required, such maintenance may be easily and expeditiously accomplished.

SUMMARY OF THE INVENTION

The instant invention is designed for use with a standard fuel filter adapter which takes the place of the conventional spin-on filter cartridge. An adapter plate spins on to the normal mounting bracket and attached thereto is a vertically oriented generally cylindrical container having a tapered conical bottom. The incoming fuel which may have water therein enters through a central tube and exits through holes in that tube into an inlet chamber located inside a conical screen member which separates the water from the fuel. Since the water is heavier than the fuel, the water will migrate towards the bottom of the chamber and the fuel will pass through the screen. Due to the size of the screen, the water will remain inside and will fall through a bottom plate into a so-called quiet zone. A valve is attached to the bottom of the quiet zone in order to expel water therefrom. The valve is operated every time the compressor on the truck (normally used for brakes and the like) operates thereby expelling a predetermined amount of fluid with each cycle.

These and other objects and advantages of my invention will become readily apparent as the following description is read in conjunction with the accompanying drawings wherein like reference numerals refer to the same or similar parts throughout the several views.

BRIEF DESCRIPTION OF THE DRAWINGS

FIG. 1 is an exploded perspective view with the partial cutaway showing the device.

FIG. 2 is a cross-sectional view of the device with significant parts broken away.

DESCRIPTION OF THE PREFERRED EMBODIMENT

A fuel-water separator, generally 10, is mounted to the conventional fuel filter mount 12. Filter mount 12 is generally used with a spin-on filter element as is well known. Filter mount 12 has inlet passage 14 and outlet passage 16 as shown in FIG. 2. This arrangement is the opposite of the way normal filters work and in order to adapt the conventional filter mount to the instant invention all one need do is reverse the lines leading to passages 14 and 16. This is required so that the inlet flow is directed down the axis of the device. Filter mount 12 is provided with an internally threaded portion 18 of inlet passage 14 to which the conventional spin-on element mounts and to which filter adapter 20 is mounted by way of threaded member 22 therein. Filter adapter 20 has inlet passage 24 therethrough in communication with inlet passage 14 of filter mount 12. A plurality of outlet apertures 26 are also provided and communicate with outlet passage 16. An "O" ring or similar seal 28 is provided on filter adapter 20 to guard against leakage. An internally threaded socket 30 is also provided in filter adapter 20 for acceptance of the core member 38 as will be described hereinafter. A circular groove 32 is provided at about the circumference of the filter adapter 20 and has located therein an "O" ring member 34 to seal against canister 36.

Canister 36 is generally cylindrical and comprises a cylindrical portion 36a and a tapered conical bottom portion 36b. The upper end of cylindrical portion 36a seats in groove 32 against "O" ring 34. Core member 38 extends through the tapered conical portion 36b of canister 36 and extends upwardly into engagement by means of threads 40 with the threaded socket 30 of filter adapter 20. Canister 36 is held in sealing engagement against filter adapter 20 by means of nut 46 which is threaded, welded or otherwise attached to core member 38. Core member 38 is partitioned into an inlet passage 38a and a drain passage 38b by partition member 44. A plurality of apertures 42 are located in the sidewall of core membmer 38 and roughly the lower one-third to one-half of the inlet passage 38a.

Located within canister 36 is separation screen assembly 50. Screen assembly 50 is basically a frustoconical screen member comprised of two layers, an outer screen member 52 and an inner screen member 54. Basically outer screen member 52 is of a fairly large mesh and serves to support the screen assembly 50 and particularly the fine mesh inner screen 54. In the preferred embodiment, inner screen 54 is made of a stainless steel screen having a 120×120 mesh and a wire diameter of 0.0035 inch while the outer screen may be made of 40×40 mesh stainless screen. Such screen per se is well known in the art for use as a fuel-water separator. Outer and inner screen members 52 and 54 respectively are glued or otherwise bonded at their upper end to sealing ring 56 having an "O" ring seal 58 located therein for seaing against core member 38. Similarly, bottom plate 60 is provided with a seal 62 at its outer circumference for sealing against canister 36 and at its inner circumference with seal 64 for sealing against core member 38. Plate 60 is provided with a small number of apertures 66 therein which allow the water to drain therethrough into quiet zone 41. The area contained by screen assembly 50 forms an inlet chamber 37 and correspondingly the area outside screen assembly 50 forms an outlet chamber 39. Drain apertures 46 are provided in the drain portion 38b of core member 38.

Threaded into nut 48 is spitter assembly 68 which communicates with drain passage 38b. Port 70 of spitter valve 68 is connected to the unloader side of the air compressor governor which is already present on most trucks. Located in spitter valve assembly are piston 74 which is biased by spring 76, ball 78 which is biased by spring 80, and check ball 82 which is biased by a spring 84. Spitter valve 68 also includes an outlet drain port 72.

OPERATION OF THE INVENTION

The fuel having some water therein enters fuel adapter 12 through intake passage 14 and thence travels through passage 24 of filter adapter 20 into intake passage 38a of core member 38. The mixture then passes through apertures 42 in the sides of core member 38 into intake chamber 37 of the device. There, the water will tend to settle towards the bottom of the device and will pass through apertures 66 in bottom plate 60 into the quiet zone 41. The fuel will then pass through screen assembly 50 by passing through layers 52 and 54 into outlet chamber 39. Because of the size of particularly inner layer 54 of screen assembly 50, only fuel is capable of passing through screen assembly 50 into outlet chamber 39. Because of the angle provided by the conical shape of screen assembly 50, any water, dirt, sediment or the like will have a tendency to fall to the bottom of intake chamber 37 rather than lodge on screen assembly 50. This is important and allows the device to remain relatively clean without disassembly and cleaning by a mechanic or the like. The cleaned fuel will then pass out of outlet chamber 39 through passages 26 and 16 into the remainder of the fuel system where it may be consumed. When the engine of the vehicle is shut off, a certain amount of back flow will take place through the system causing any particles or the like which are lodged on the screen assembly to be forced toward the core member 38 of the device. Again, because of the conical shape, these particles will tend to fall downwardly to the bottom plate 60 of the device rather than being perhaps blown a short ways away from the screen and then relodging thereupon so that no cleaning effect will have taken place. Thus, the conical shape plays an important role in the efficient operation of the device. The downward facing face of the screen assembly 50 which contains the inlet chamber 37 allows this additional filtering step to take place.

Water to be disposed of is collected in quiet zone 41 and will pass through apertures 46 into the drain portion 38b of core member 38 and thence downward into spitter assembly 68. Inlet port 70 of spitter assembly 68 is connected to the unloader side of the air compressor governor which is present on most diesel trucks for use in conjunction with the braking system. Each time the braking compressor is activated, port 70 will be pressurized thereby forcing piston 74 inwardly against spring 76 thereby pressurizing discharge chamber 77 and forcing ball 78 outwardly against spring 80 thereby allowing fluid from chamber 77 to flow through discharge port 72. As the fluid from discharge chamber 77 is exhausted, ball 78 will be forced back onto its seat. Thereafter, upon the depressurization of port 70, piston 74 will be returned to its position as shown in FIG. 2 by spring 76 thereby creating a partial vacuum in chamber 77. At that time, check ball 82 will open allowing a fresh charge of water into chamber 77. Once that partial vacuum has been satisfied, check ball 82 will reclose from the pressure of spring 84 and the system is ready for another cycle. Spitter assembly 68 is then, a miniature pump which is activated and powered solely by braking system already on the vehicle.

It is to be noted that the fuel-water separator as described above is particularly effective when used in conjunction with a fuel heater such as the type shown in U.S. Pat. No. 3,929,187. This efficiency results from the fact that the warmed fuel is thinner and therefore allows a smaller screen mesh to be used in the screen assembly such that the fuel will still pass therethrough. Also, warmed fuel drops its water much more readily than colder fuel which enhances the separation process and makes the instant invention substantially more effective.

While the preferred embodiments of the present invention have been described, it should be understood that various changes, adaptations and modificatons may be made therein without departing from the spirit of the invention and the scope of the appended claims.

What is claimed is:

1. A fuel-water separator for use with diesel fuel, said separator comprising:
   an inlet chamber for receiving fuel;
   an outlet chamber;
   a separation screen means having first and second faces facing said inlet chamber and said outlet chamber respectively, said screen means for passing only diesel fuel therethrough while preventing the passage of water, said screen means first face facing generally downwardly such that water, sediment and the like will fall away from said first face, said screen means having a downwardly diverging frustroconical shape;
   a cylindrical housing having top and bottom ends, said separation screen means being located in said housing and extending from said top end to said bottom end, said inlet chamber being inside said screen means and said outlet chamber being located between said screen means and said housing;
   a bottom plate, said bottom plate having aperture means therein, the cross sectional area of said aperture means being small relative to the total area of said plate, said plate being located above said housing bottom end and in sealing relationship to the bottom of said screen means and said housing;
   a hollow cylindrical core member having a top and bottom, the interior of said core member being connected at said core top to a source of fuel to be cleaned, said core member being located inside of and coaxial with said housing and said screen means and extending at least the length of said screen means, said core member having a plurality of radially directed apertures therethrough above said bottom plate, said apertures being located in the bottom half of the portion of said core in said housing, the top half of said core being impervious to the passage of fluids;
   a quiet zone located beneath said bottom plate and in communicaton with said inlet chamber by said aperture means; means for generating a periodic signal
   means for draining water from said quiet zone, said means being responsive to said periodic signal; and
   an outlet passage in communication with said outlet chamber.

2. The fuel-water separator of claim 1 in combination with a fuel heater connected to said fuel-water separator, said inlet chamber receiving heated fuel from said heater.

* * * * *